United States Patent [19]

Gilbert

[11] Patent Number: 4,849,514

[45] Date of Patent: Jul. 18, 1989

[54] PROCESS FOR MAKING AZIDODEOXYCELLULOSE

[75] Inventor: Everett E. Gilbert, Morristown, N.J.

[73] Assignee: The United States of America as represented by the Secretary of the Army, Washington, D.C.

[21] Appl. No.: 164,769

[22] Filed: Mar. 7, 1988

[51] Int. Cl.$^4$ ............................ C08B 1/04; C08B 5/04
[52] U.S. Cl. ........................................ 536/36; 536/38; 536/37; 536/35
[58] Field of Search ................................... 536/36, 38

[56] References Cited

PUBLICATIONS

U.S. Statutory Invention Registration H430 2/88, Carignan et al.

*Primary Examiner*—John Kight
*Assistant Examiner*—Frederick Krass
*Attorney, Agent, or Firm*—Robert P. Gibson; Edward Goldberg; Edward F. Costigan

[57] ABSTRACT

This invention is an improved process of making azidodeoxycellulose a highly energetic ingredient for use in a propellant. The process is accomplished by nitrating cellulose to nitrocellulose, converting the nitrocellulose in sequence to the iodine derivative, and finally reacting the iodine derivative of cellulose with sodium azide to produce azidodeoxycellulose having up to about 1.5% residual nitrogen as nitrate groups.

5 Claims, No Drawings

PROCESS FOR MAKING AZIDODEOXYCELLULOSE

GOVERNMENTAL INTEREST

The invention described herein may be manufactured, used and licensed by or for the Government for Governmental purposes without payment to me of any royalties thereon.

FIELD OF INVENTION

This invention relates to an improved process of making azidodeoxycellulose. In the art, azidodeoxycellulose is made by initially mercerizing cellulose with sodium hydroxide, filtering, and washing with methanol. In sequence, the mercerized cellulose is then converted to the tosylate derivative. This procedure is set forth in Roberts, J. Am. Chem. Sec. 79, 1175 (1957). Finally, the latter product is treated with sodium azide to produce azidodeoxycellulose. See Azov, et al., Chem. Abstracts 79, 93618 (1973).

However, the steps of the foregoing process are quite complicated, and the costs of the reactants to produce the desired product are relatively high.

SUMMARY OF INVENTION

It is an object of this invention to provide an improved process of making azidodeoxycellulose which is simple, and relatively inexpensive when compared to the process of the art as heretofore described.

This invention provides an improved process of making azidodeoxycellulose by nitrating cellulose to nitrocellulose, converting nitrocellulose in sequence to the iodine derivative, and reacting the latter iodine derivative with sodium azide to produce azidodeoxycellulose having up to about 1.5% residual nitrogen as groups.

PREFERRED EMBODIMENT

In the preferred embodiment, cellulose is nitrated with nitric acid to produce nitrocellulose having less than about 10 percent nitrogen. This is accomplished by the procedure set forth in the Journal of Energetic Materials 3, 321 (1985). For instance, cellulose, (buckeye linters, ground in a Waring blender and in a Wylie Attrition mill, then dried in vacuo to constant weight, is added at room temperature to a magnetically stirred solution of commercial 90% nitric acid in dichloromethane placed in a stoppered Erlenmeyer flask. After stirring for one hour, the suspension is filtered on a fritted glass filter, and the precipitate is washed with dichloromethane, and then with water. The solid is twice boiled with water, filtered, and dried to constant weight in vacuo. The nitrocellulose is then converted to the iodine derivative, i.e. iodocellulose, by heating the same with sodium or potassium iodide. The procedure accepted for this purpose is that of Murray and Purves, J. Am. Chem. 62, 3192 (1940). For instance, starting with cellulose nitrate containing 5 to 9% nitrogen, a nearly quantitative weight percent yield of products containing 20 to 33% iodine with as low as 0.7% nitrogen is obtained using ketonic solvents and sodium iodide at 115°–120° for about 12 hours. The product of this procedure contains a small amount of residual nitrate groups. The iodocellulose is then reacted with sodium azide to produce azidodeoxycellulose containing a small quantity of nitrate groups, corresponding to less than 1.5 percent nitrogen maximum.

The compositions of this invention are useful as propellants and the like.

EXAMPLE 1

Iodocellulose (0.5 g), containing 34.1% iodine and 1.2% nitrogen, sodium azide (1.0 g), and dimethylformamide (35 ml) were heated with stirring for 7 hours in the range of between about 75° and about 80° C. The mixture was cooled, poured into water, and the precipitate filtered and dried. The product yield of azidodeoxycellulose was 0.25 g.

The product contained 16.5% nitrogen and less than 0.4% iodine.

The infrared curve showed the presence of azide and nitrate groups.

Upon heating the product on a spatula, the product flashed energetically. Upon heating to 220° C. in a melting point capillary, the product turned black.

EXAMPLE 2

Example 1 was repeated. However, in this instance, the iodocellulose contained 32.5% iodine and 0.9% nitrogen. The product yield was 0.3 g and contained 15.1% nitrogen and 0.9% iodine.

The spectra and thermal behavior of the product was similar to that of the product of Example 1.

EXAMPLE 3

Example 1 was again repeated, under the same conditions, with 1.5 g of iodocellulose which contained 36.3% iodine and 1.2% nitrogen.

The product yield of 0.95 g contained 17.0% nitrogen and 1.1% iodine.

The spectra and thermal behavior of the product was similar to that of Example 1.

The foregoing disclosure is merely illustrative of the principles of this invention and is not to be interpreted in a limiting sense. I wish it to be understood that I do not desire to be limited to the exact details described because obvious modifications will occur to a person skilled in the art.

I claim:

1. A process for making azidodeoxycellulose comprising nitrating cellulose to nitrocellulose, converting said nitrocellulose to the iodine derivative, and reacting said iodine derivative with sodium azide to produce azidodeoxycellulose having up to about 1.5% nitrogen in the form of residual nitrate groups.

2. The process of claim 1 wherein between about 0.5 and 1.5 g of said iodine derivative of nitrocellulose is present in proportion to about 1 g of sodium azide.

3. The process of claim 1 wherein between about 0.5 and 1.5 g of the iodine derivative of nitrocellulose, about 1 g of sodium azide, and about 35 ml of dimethylformamide are heated, with stirring, for about 7 hours at a temperature between about 75° and about 80° C.

4. The process of claim 3 wherein about 0.5 g of the iodine derivative of nitrocellulose is present.

5. The process of claim 3 wherein about 1.5 g of the iodine derivative of nitrocellulose is present.

* * * * *